(12) United States Patent
Lee et al.

(10) Patent No.: US 7,658,531 B2
(45) Date of Patent: Feb. 9, 2010

(54) BACKLIGHT UNIT HAVING IMPROVED CHROMATIC DISPERSION

(75) Inventors: Hong-seok Lee, Seongnam-si (KR); Dong-ho Wee, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 86 days.

(21) Appl. No.: 11/872,128

(22) Filed: Oct. 15, 2007

(65) Prior Publication Data

US 2008/0253147 A1    Oct. 16, 2008

(30) Foreign Application Priority Data

Apr. 12, 2007    (KR) .................... 10-2007-0036173

(51) Int. Cl.
*F21V 7/04*    (2006.01)
*F21V 5/00*    (2006.01)
*G02F 1/1335*    (2006.01)

(52) U.S. Cl. .................. 362/606; 362/619; 362/330; 349/62

(58) Field of Classification Search .......... 362/606, 362/607, 617, 619, 620, 618, 627, 330; 349/62, 349/63, 64, 66; 359/599, 566, 568, 569, 359/572
See application file for complete search history.

(56) References Cited

U.S. PATENT DOCUMENTS

| 6,151,166 | A  | * | 11/2000 | Matsushita et al. | .......... 359/566 |
| 6,880,946 | B2 | * | 4/2005  | Mullen            | .......... 362/627 |
| 7,364,340 | B2 | * | 4/2008  | Choi et al.       | .......... 362/619 |
| 7,420,735 | B2 | * | 9/2008  | Hikichi et al.    | .......... 359/569 |
| 2004/0240232 | A1 | * | 12/2004 | Choi et al.    | .......... 362/583 |
| 2005/0195487 | A1 | * | 9/2005  | Yu et al.      | .......... 359/599 |
| 2006/0007700 | A1 | * | 1/2006  | Hsu et al.     | .......... 362/600 |
| 2007/0081359 | A1 | * | 4/2007  | Kim et al.     | .......... 362/608 |

* cited by examiner

*Primary Examiner*—Ismael Negron
*Assistant Examiner*—David R Crowe
(74) *Attorney, Agent, or Firm*—Sughrue Mion, PLLC (57) ABSTRACT

Provided is a backlight device that includes: a light guide panel having a diffraction pattern for emitting light through an emission surface of the light guide panel by diffracting light entering the light guide panel; and a chromatic dispersion compensation member that is an optical transmitting member located on a light emission side of the light guide panel and has a lattice pattern having a depth in a direction vertical to the emission surface of the light guide panel.

14 Claims, 13 Drawing Sheets

BACKLIGHT UNIT HAVING IMPROVED CHROMATIC DISPERSION

CROSS-REFERENCE TO RELATED PATENT APPLICATION

This application claims the benefit of Korean Patent Application No. 10-2007-0036173, filed on Apr. 12, 2007, in the Korean Intellectual Property Office, the disclosure of which is incorporated herein in its entirety by reference.

BACKGROUND OF THE INVENTION

1. Field of the Invention

The present invention relates to a backlight device, and more particularly, to a backlight device that employs a light guide panel having a diffraction pattern.

2. Description of the Related Art

Figure 1:
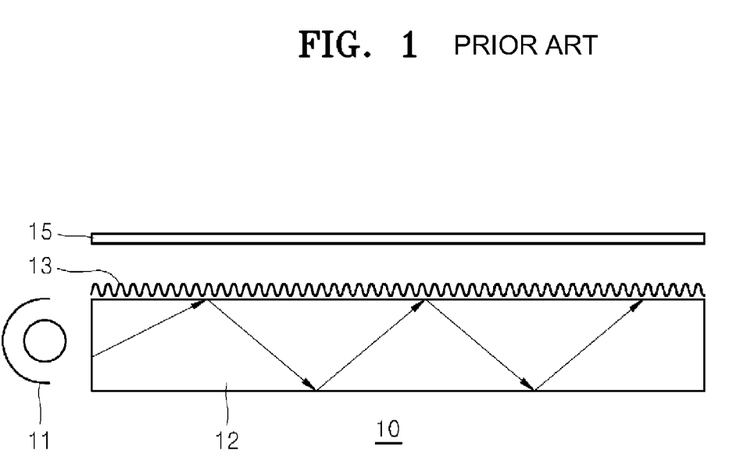
FIG. 1 is a schematic cross-sectional view of a conventional backlight device having a light guide panel that uses a diffraction pattern.

Non-emissive flat panel display devices, such as a liquid crystal display, require a flat fluorescent light source such as a backlight unit. FIG. 1 is a schematic cross-sectional view of a backlight device 10 having a light guide panel 12. Referring to FIG. 1, the backlight device 10 includes the light guide panel 12 having a diffraction pattern 13 that is fine on an upper or lower surface thereof, and a light source 11 on a side of the light guide panel 12.

The light source 11 can be a point light source such as a white light emitting diode (LED) or a line light source such as a cold cathode fluorescent lamp (CCFL). White light emitted from the light source 11 enters the light guide panel 12 through a side of the light guide panel 12 formed of a material such as poly methyl methacrylate (PMMA) having a high optical transmittance, and proceeds in the light guide panel 12 by total reflection. Since the diffraction pattern 13 is formed on an upper surface of the light guide panel 12, a portion of the white light that enters the upper surface of the light guide panel 12 is emitted to the upper surface of the light guide panel 12 due to diffraction caused by the diffraction pattern 13. White light emitted to the upper surface of the light guide panel 12 is uniformly diffused by a diffuser sheet 15, and thus, illuminates a flat panel display device.

The diffraction pattern 13 can be formed by mechanically cutting the light guide panel 12 along its surface, by pressing a stamp against the surface of the light guide panel 12 where the diffraction pattern 13 is to be formed, or using the interference of a laser beam.

Figure 2A:
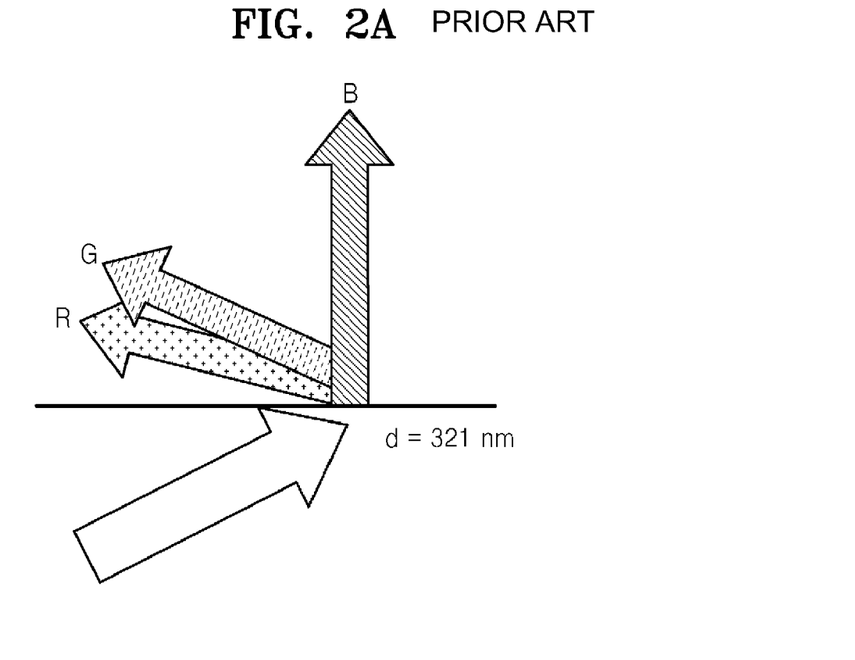
FIGS. 2A through 2C are schematic drawings showing chromatic dispersion due to a diffraction pattern having a single period.
Figure 2B:
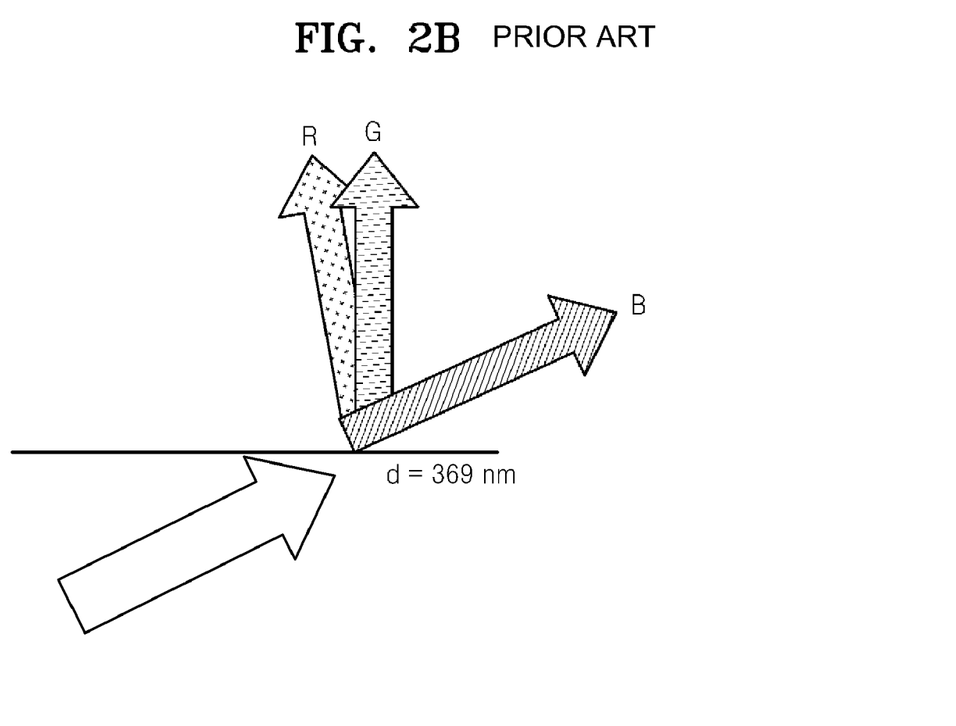
Figure 2C:
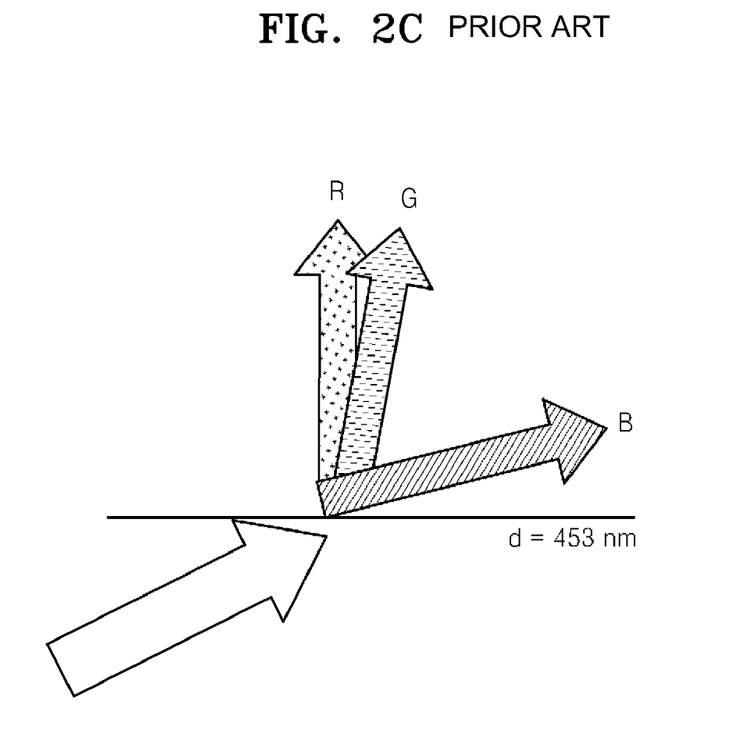

However, there is chromatic dispersion when the white light is emitted to the upper surface of the light guide panel 12 through the diffraction pattern 13 since the refractive index and the transmittance of light varies according to the wavelengths of light. FIGS. 2A and 2C are schematic drawings for explaining the chromatic dispersion of light, that is, emission angles of red light R, green light G, and blue light B according to the variation of the period d of the diffraction pattern 13. Here, it is assumed that the refractive index n of the light guide panel 12 is 1.59, the angle of total reflection of light in the light guide panel 12 is 39°, and the center-proceeding angle of light proceeding in the light guide panel 12 is 64.5°. Hence, when the wavelength of the red light is 620 nm, the wavelength of the green light is 530 nm, and the wavelength of the blue light is 460 nm, if the period d of the diffraction pattern 13 is 321 nm, blue light is vertically emitted from the plate light guide panel 12, if the period d of the diffraction pattern 13 is 369 nm, green light is vertically emitted, and if the period d of the diffraction pattern 13 is 453 nm, red light is vertically emitted. Accordingly, when a diffraction pattern having a single period is used, color is separated due to the diffraction pattern since the angles of light emitted from the diffraction pattern are different according to the wavelengths of light.

Figure 3:
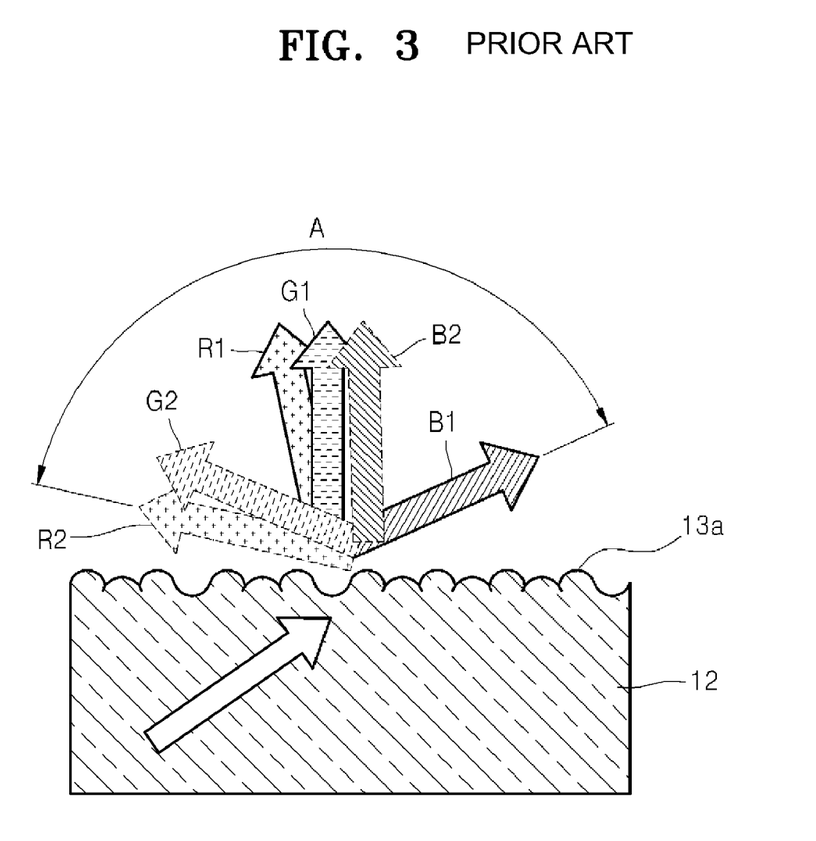
FIG. 3 is a schematic drawing showing the mitigation of chromatic dispersion in a light guide panel in which a diffraction pattern has two frequencies.

To address the above problem, as depicted in FIG. 3, a method of using a diffraction pattern 13a having more than two frequencies has been disclosed. For example, a diffraction pattern 13a having a period d of 321 nm and another diffraction pattern 13 having a period d of 369 nm are mixed. Among red light R1, green light G1, and blue light B1 emitted by the diffraction pattern 13 having a period d of 369 nm, the green light G1 is vertically emitted. Also, among red light R2, green light G2, and blue light B2 emitted by the diffraction pattern 13 having a period d of 321 nm, the blue light B2 is vertically emitted. Thus, the chromatic dispersion can be mitigated to some degree due to the mixing of red light, green light, and blue light. However, in this case, a spread angle A of light is increased, and thereby, resulting in reducing front-view brightness. Also, the mitigation effect of chromatic dispersion with respect to emitted light R2, G2, and B1 having a large spread angle A is reduced.

SUMMARY OF THE INVENTION

To solve the above and/or other problems, the present invention provides a backlight device that can mitigate chromatic dispersion due to a diffraction lattice pattern of a light guide panel.

According to an aspect of the present invention, there is provided a backlight device that forms a flat fluorescent light source for illuminating a flat panel display device, comprising: a light guide panel having a diffraction pattern for emitting light through an emission surface of the light guide panel by diffracting light entering the light guide panel; and a chromatic dispersion compensation member that is an optical transmitting member located on a light emission side of the light guide panel and has a lattice pattern having a depth formed in a direction vertical to the emission surface of the light guide panel.

A period of the diffraction pattern may be determined so that a center axis of light that is emitted from the light guide panel by being chromatically dispersed into red, green, and blue light is vertical with respect to the emission surface of the light guide panel.

An aspect ratio, which is a ratio of the depth to the width, of the lattice pattern may be 5 or more.

When it is assumed that a half angle of a spread angle of light emitted from the light guide panel by being chromatically dispersing into red, green, and blue light is θ and a refractive index of the lattice pattern is n, the aspect ratio of the lattice pattern is $$\cot\left(\arcsin\left(\frac{\sin\theta}{n}\right)\right)$$

or more, wherein the aspect ratio is a ratio of the depth to the width of the lattice pattern.

The period and the depth of the lattice pattern may be determined so that the amount of light emitted from the chromatic dispersion compensation member after being reflected by the lattice pattern and the amount of light emitted from the chromatic dispersion compensation member by being directly transmitted through the lattice pattern are nearly equal.

The lattice pattern may have a period greater than a period that causes diffraction.

The period of the lattice pattern may be less than a period that allows the lattice pattern to be visually recognized in the flat panel display device.

The period of the lattice pattern may be in a range from 10 μm to 300 μm.

The chromatic dispersion compensation member may comprise a base film, and the lattice pattern may be formed on a lower surface of the base film facing the emission surface of the light guide panel. The base film may comprise a dispersion pattern that disperses light and a focusing pattern that focuses light is formed on an upper surface of the base film.

According to an aspect of the present invention, there is provided a backlight device that forms a flat fluorescent light source for illuminating a flat panel display device, comprising: a light guide panel having a diffraction pattern having a single period for emitting light through an emission surface of the light guide panel by diffracting light entering the light guide panel; and a chromatic dispersion compensation member that is an optical transmitting member located on a light emission side of the light guide panel, reverses a portion of chromatically dispersed light emitted from the light guide panel with respect to a line that is vertical with respect to the emission surface of the light guide panel, and transmits the other portion of chromatically dispersed light emitted from the light guide panel.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

A backlight device according to the present invention will now be described more fully with reference to the accompanying drawings in which exemplary embodiments of the invention are shown.

Figure 4:
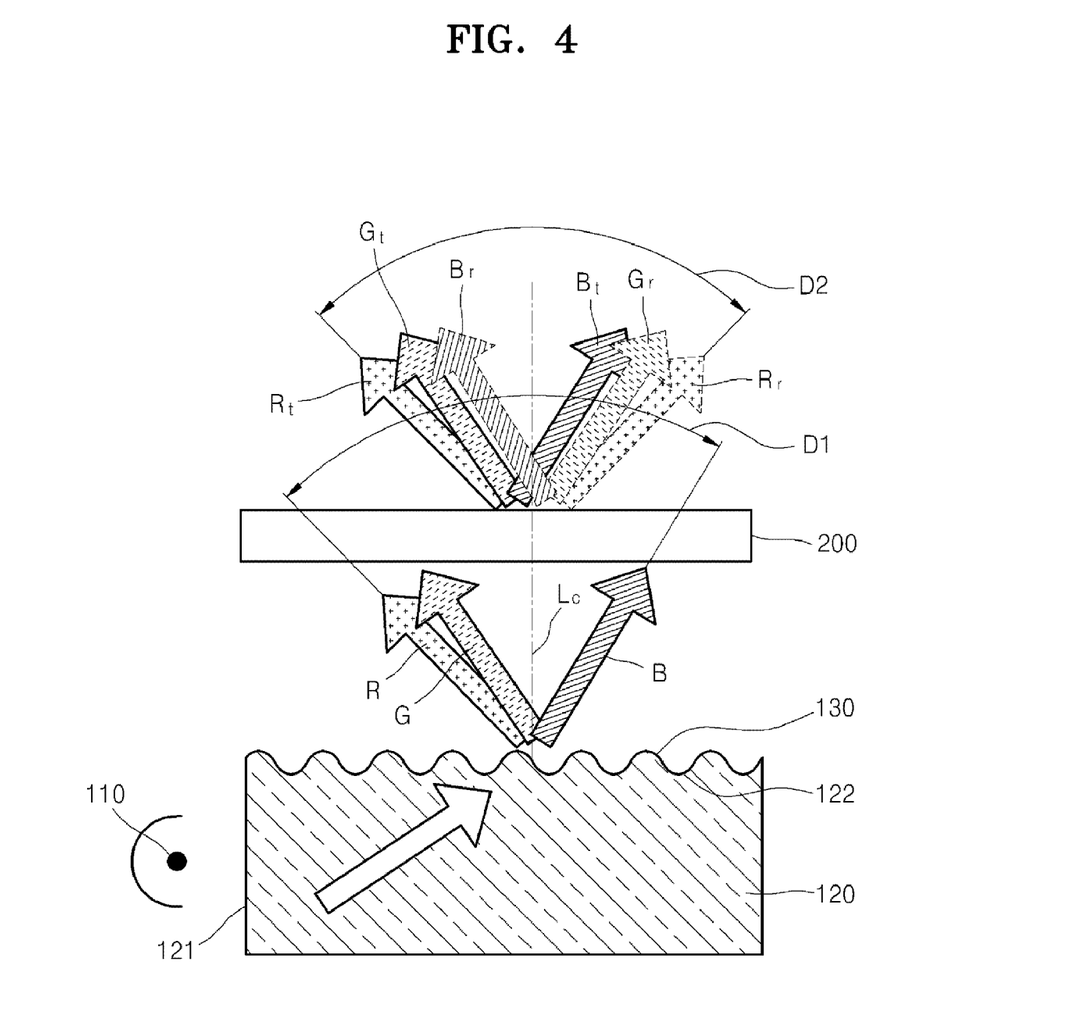
FIG. 4 is a schematic drawing of a conceptual configuration of a backlight device according to an embodiment of the present invention.

The backlight device denotes a flat fluorescent light source for illuminating a non-emissive flat panel display device such as a liquid crystal display (LCD). FIG. 4 is a schematic drawing of a conceptual configuration of a backlight device according to an exemplary embodiment of the present invention. Referring to FIG. 4, a diffraction pattern 130 is formed on an upper surface 122 of a light guide panel 120. Light emitted from a light source 110 enters the light guide panel 120 through a side 121 of the light guide panel 120. The diffraction pattern 130 can be formed by mechanically processing the upper surface 122 of the light guide panel 120 or by pressing a stamp on where the diffraction pattern 130 is to be formed against the upper surface 122 of the light guide panel 120. Alternatively, the light guide panel 120 having the diffraction pattern 130 can be formed by molding or injection molding using a master after manufacturing the master by using the interference of a laser beam. The light source 110 can be a point light source such as a white light emitting diode (LED) or a line light source such as a cold cathode fluorescent lamp (CCFL). White light that enters the light guide panel 120 through the side 121 of the light guide panel 120 proceeds in the light guide panel 120 by total reflection. A portion of light entering towards the upper surface 122 of the light guide panel 120 is diffracted by the diffraction pattern 130, is emitted by transmitting through the upper surface 122 (light emitting surface) of the light guide panel 120, and enters a flat panel display device through an optical plate such as a diffuser sheet (not shown). The diffraction pattern 130 can be formed on one of the upper surface 122 or a lower surface of the light guide panel 120.

Light emitted through the upper surface 122 of the light guide panel 120, as depicted in FIG. 4, is chromatically dispersed into red light R, green light G, and blue light B due to the wavelength characteristics of the diffraction pattern 130. As such, when a flat panel display device is illuminated using the chromatically dispersed light emitted through the upper surface 122 of the light guide panel 120, the color of an image is distorted according to viewing angles.

The backlight device according to the present exemplary embodiment includes a chromatic dispersion compensation member 200 on a light emission side of the light guide panel 120. The chromatic dispersion compensation member 200 transmits portions of red light R, green light G, and blue light B, and symmetrically reflects the other portions of the red light R, green light G, and blue light B based on a line that is vertical with respect to the light emitting surface of the light guide panel 120. Hence, the transmission light Rt, Gt, and Bt and the reflection light Rr, Gr, Br are mixed with each other, and thus, the chromatic dispersion can be mitigated. Also, since a spread angle D1 of light emitted from the light guide panel 120 and a spread angle D2 of light emitted from the chromatic dispersion compensation member 200 are almost identical, and thus, the reduction of brightness in a process of color compensation can be greatly reduced.

Figure 5:
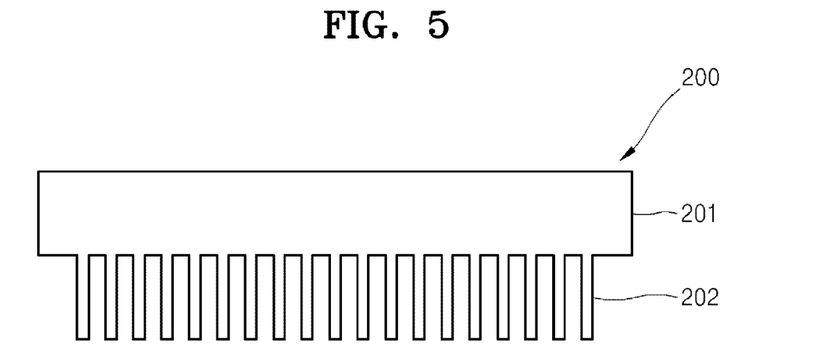
FIG. 5 is a detailed drawing of the chromatic dispersion compensation member of FIG. 4, according to an embodiment of the present invention.
Figure 6:
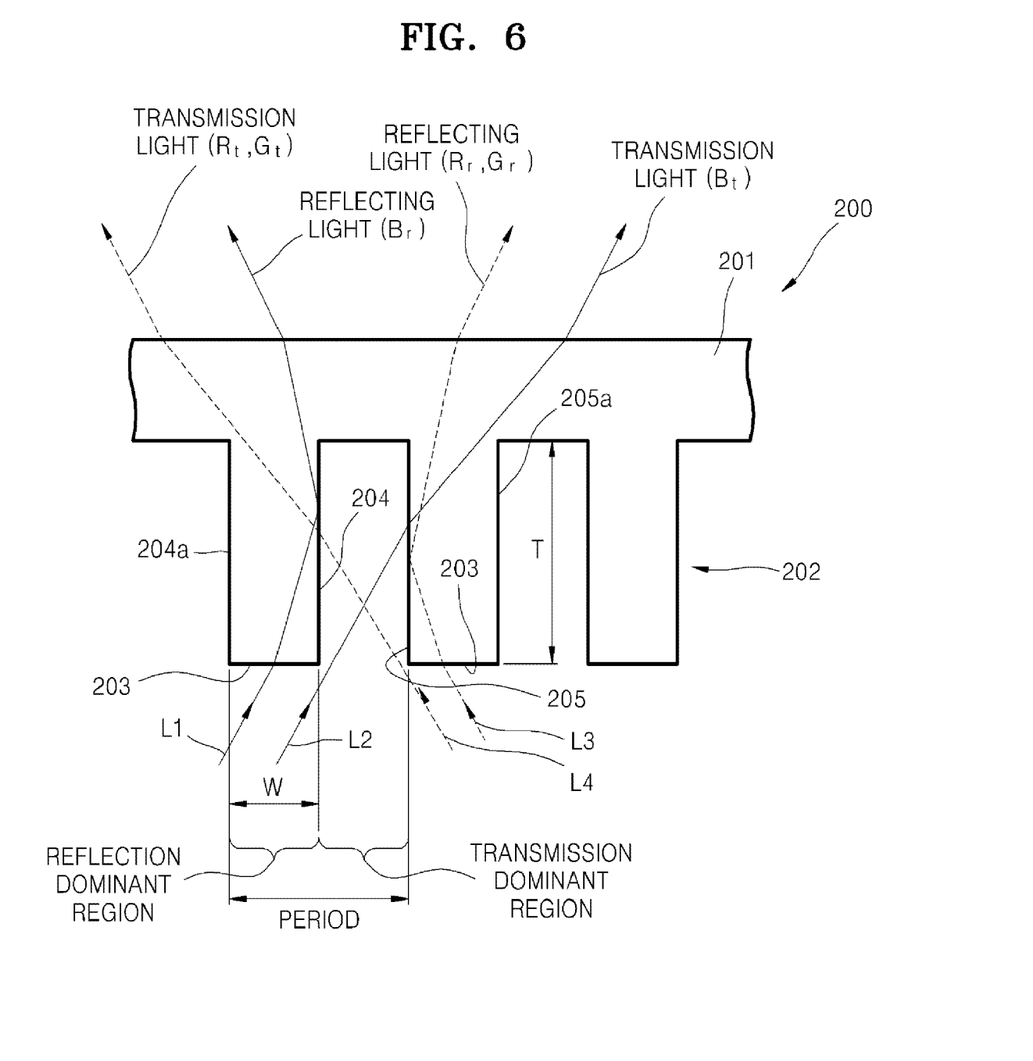
FIG. 6 is a detailed drawing of the lattice pattern of FIG. 4, according to an embodiment of the present invention.

FIG. 5 is a cross-sectional view of the chromatic dispersion compensation member 200, and FIG. 6 is a detailed drawing showing a lattice pattern 202 of the chromatic dispersion compensation member 200, according to embodiments of the present invention. The chromatic dispersion compensation member 200 is a transparent member, and includes the lattice pattern 202 that can be formed on a lower surface of a base film 201 facing the upper surface 122 of the light guide panel 120. The lattice pattern 202 is a square shaped pattern having a depth T in a perpendicular direction with respect to the upper surface 122 of the light guide panel 120. Light L1 entering the lattice pattern 202 through a lower surface 203 of the lattice pattern 202 is reflected by a side surface 204. The lower surface 203 has a width W. The side surface 204 is a boundary surface between the lattice pattern 202 and an external medium, for example, air. The lattice pattern 202 has a refractive index greater than that of air, and thus, most of the light L1 is reflected by the side surface 204 and exits the chromatic dispersion compensation member 200. However, light L2 that enters the lattice pattern 202 through a side surface 205 not the lower surface 203, directly exits the chromatic dispersion compensation member 200. That is, in a period of the lattice pattern 202, rectangularly shaped protruded regions having the lower surfaces 203 are reflection dominant regions, and rectangularly shaped concaved regions that do not have the lower surfaces 203 are transmission dominant regions. The protruded regions and concaved regions are provided in an alternating pattern. For example, blue light B that has passed through the reflection dominant regions of the lattice pattern 202 becomes a reflection light Br having a reversed proceeding angle with respect to the side surface 204, and blue light B that has passed through the transmission dominant regions of the lattice pattern 202 becomes a transmission light Bt having an unchanged proceeding angle with respect to the side surface 204. Also, as shown by the dotted lines in FIG. 6, light L3 (red light R and green light G) that has passed through the reflection dominant regions of the lattice pattern 202 becomes reflection light Rr and Gr having a reversed proceeding angle with respect to the side surface 205, and light L4 (red light R and green light G) that has passed through the transmission dominant regions of the lattice pattern 202 is a transmission light Rt and Gt having an unchanged proceeding angle with respect to the side surface 205.

As depicted in FIG. 4, due to the above configuration, from among the lights R, G, and B emitting from the light guide panel 120, the lights that have passed through the transmission dominant regions of the lattice pattern 202 are transmission lights Rt, Gt, and Bt having an unchanged proceeding angle, and the lights that have passed through the reflection dominant regions of the lattice pattern 202 are reflection lights Rr, Gr, and Br having a reversed proceeding angle with respect to the side surface 204 or 205. Thus, light that has passed through the chromatic dispersion compensation member 200 is mixed light of red, green, and blue lights, thereby mitigating the chromatic dispersion.

In the above description, the terminologies of reflection dominant region and transmission dominant region are used for convenience of explanation. That is, the reflection dominant regions are not regions where total reflection occurs, and the transmission dominant regions are not regions where total transmission occurs. As will be described later, if an aspect ratio of the lattice pattern 202 increases, light L1 can enter the side surface 204a that faces the side surface 204 after being reflected by the side surface 204, and then, can be reflected by the side surface 204a that faces the side surface 204. In this case, the light L1 proceeds in the same direction as the transmission light. Also, light L2, after being transmitted the side surface 205, can enter the side surface 205a that faces the side surface 205, and then, can be reflected by the side surface 205a that faces the side surface 205. In this case, the light L2 proceeds in the same direction as the reflection light. However, since the amount of light L1 that proceeds in the same direction as the transmission light and the amount of light L2 that proceeds in the same direction as the reflection light are equal, the mitigation effect of chromatic dispersion is still present. According to the determination of the aspect ratio of the lattice pattern 202, all of the light L1 can proceed in the same direction as the transmission light and all of the light L2 can proceed in the same direction as the reflection light.

In order to maintain the spread angle D2 of light that has passed through the chromatic dispersion compensation member 200 as small as possible, a center axis $L_c$ (refer to FIG. 4) of chromatically dispersed light R, G, and B emitted from the light guide panel 120 may be vertical with respect to the upper surface 122 of the light guide panel 120. In this case, the spread angle D1 of the chromatically dispersed light R, G, and B emitted from the light guide panel 120 is almost similar to the spread angle D2 of chromatically dispersed light Rt, Gt, Bt, Rr, Gr, and Br emitted from the chromatic dispersion compensation member 200.

It is well known to one skilled in the art that an emission angle of light emitted from the light guide panel 120 depends on the refractive index of the light guide panel 120, the period of the diffraction pattern 130, and the wavelength of light. Accordingly, one skilled in the art can determine the period of the diffraction pattern 130 that meets the condition that the center axis $L_c$ of light can be vertical with respect to the upper surface 122 of the light guide panel 120. For example, by assuming that the refractive index $n_{LGP}$ of the light guide panel 120 is 1.59, the total reflection angle of light in the light guide panel 120 is 39°, and the center-proceeding angle of light that proceeds in the light guide panel 120 is 65°, if the period of the diffraction pattern 130 is 350 nm, the center axis $L_c$ of light is nearly vertical to the upper surface 122 of the light guide panel 120. The center axis $L_c$ of light is the center axes of red light R and blue light B.

The lattice pattern 202 is formed to obtain appropriate reflection light and transmission light, and thus, the lattice pattern 202 must not generate unnecessary diffraction. Accordingly, the lattice pattern 202 must have a period in a range that does not generate diffraction. In the case of a refractive index of an optical transmittance material such as poly methyl methacrylate (PMMA) or poly carbonate (PC) that is generally used for forming white light and the chromatic dispersion compensation member 200, if the period of the lattice pattern 202 is 10 μm or more, nearly no diffraction occurs. The lattice pattern 202 may not be visually recognized when the lattice pattern 202 is viewed from a side of the flat panel display device, and this condition can be met when the period of the lattice pattern 202 is 300 μm or less.

Figure 7:
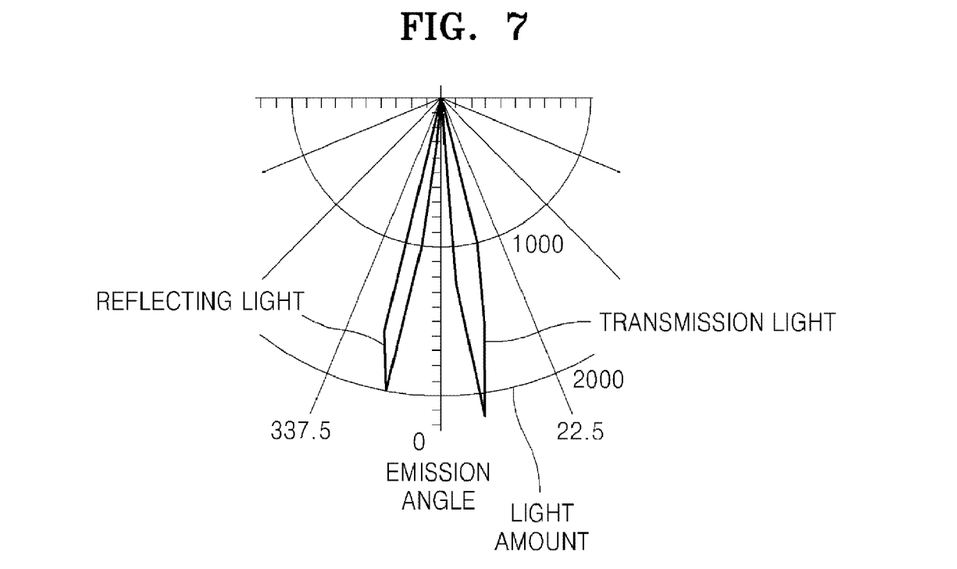
FIG. 7 is a graph showing the measurements of the amount of reflection light and the amount of transmission light when an aspect ratio of the lattice pattern is greater than 5.

The condition of the lattice pattern 202 for further increasing the chromatic dispersion compensation effect will now be described. Referring to FIG. 4, mitigating the chromatic dispersion is more effective by making the amounts of transmission light Rt, Gt and Bt and the reflection light Rr, Gr and Br as equal as possible. Thus, it is necessary to find out the conditions to make the amounts of transmission light Rt, Gt and Bt and the reflection light Rr, Gr and Br as equal as possible through a simulation. After an incident angle of light entering the lattice pattern 202 is arbitrarily determined, the period of the lattice pattern 202 is changed in the range of 10 to 300 μm. Afterwards, through a simulation, the amounts of transmission light Rt, Gt and Bt and reflection light Rr, Gr and Br are measured by changing a width W (FIG. 6) and depth T (FIG. 6) of the lattice pattern 202. According to the simulation, as depicted in FIG. 7, when the aspect ratio, that is, a ratio of the depth T with respect to the width W of the lattice pattern 202 is greater than 5, the amounts of transmission light Rt, Gt and Bt and reflection light Rr, Gr and Br are almost equal and the emission angles of the transmission light Rt, Gt and Bt and reflection light Rr, Gr and Br are almost symmetrical with respect to 0 degrees. Accordingly, an effective mitigation of chromatic dispersion can be achieved by making the lattice pattern 202 having an aspect ratio of 5 or more. Also, it is seen that the spread angle D2 (refer to FIG. 4) of light that has passed through the chromatic dispersion compensation member 200 is hardly increased.

Figure 8:
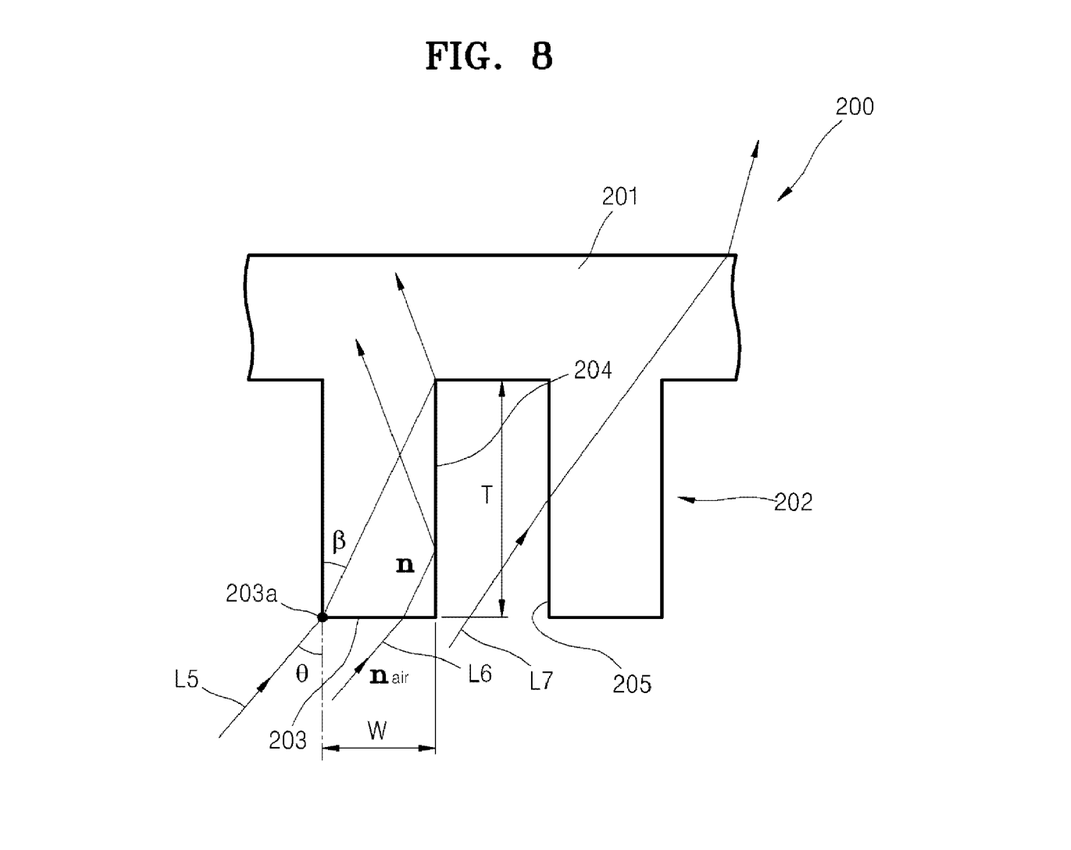
FIG. 8 is a schematic drawing showing optical paths for an analytical approach to obtain an aspect ratio of a lattice pattern when the amount of reflection light and the amount of transmission light is equal.

Almost all of the lights L2 and L4 that enters the lattice pattern 202 through the transmission dominant regions of the lattice pattern 202 transmit the side surface 204 or 205. Thus, if the lights L1 and L3 that enters the lattice pattern 202 through the reflection dominant regions, that is, the lower surfaces 203 of the lattice pattern 202, are made to be reflected by the side surface 204 or 205, the amounts of transmission light and reflection light are almost equal. Based on this fact, the condition of the aspect ratio such that the amounts of transmission light and reflection light are almost equal is calculated with reference to FIG. 8. Referring to FIG. 8, lights L5 and L6 emitted from the light guide panel 120 have an incident angle of θ with respect to the lower surface 203 of the lattice pattern 202. At this point, the incident angle θ is a half angle of the spread angle D1 of the chromatically dispersed light R, G, and B when the center axis of the chromatically dispersed light R, G, and B is vertical with respect to the upper surface 122 of the light guide panel 120. If the light L5 entering the lattice pattern 202 through edges 203a of the lower surfaces 203 of the lattice pattern 202 can be made to enter the side surface 204, all of the lights L5 and L6 entering through the lower surfaces 203 of the lattice pattern 202 can be made to be reflected by the side surface 204. In FIG. 8, it is seen that the proceeding angle β of the light L5 in the lattice pattern 202 is expressed as $$\beta = \arcsin\left(\frac{\sin\theta}{n}\right)$$

from Snell's Law, where n is the refractive index of the lattice pattern 202, and the refractive index $n_{air}$ of air is assumed to be 1. Accordingly, the aspect ratio (T/W) of the lattice pattern 202 is expressed as the ratio of the depth T to the width W of the lattice pattern 202, that is, $$T/W = \cot(\beta) = \cot\left(\arcsin\left(\frac{\sin\theta}{n}\right)\right).$$

If T/W meets the condition of $$\cot\left(\arcsin\left(\frac{\sin\theta}{n}\right)\right)$$

or more, the light L3 that enters the lattice pattern 202 through the lower surface 203 of the lattice pattern 202 is reflected by the side surface 204, and light L7 that enters the lattice pattern 202 through the side surface 205, not through the lower surfaces 203 of the lattice pattern 202, is directly transmitted almost without reflection. Thus, the amounts of transmission light and reflection light are almost equal. The width W of the reflection dominant regions can be a half of the period of the reflection dominant regions; however, it is not a necessity and the present invention is not limited thereto. That is, the width W of the reflection dominant regions for which the amounts of transmission light and reflection light can be nearly equal can be determined by measuring the amounts of transmission light and reflection light. Here, the side surfaces 204 and 205 of the lattice pattern 202 are parallel to the vertical line with respect to the emission surface of the light guide panel 120, however, the present invention is not limited thereto. The side surfaces 204 and 205 can have a predetermined angle with respect to the vertical line of the emission surface of the light guide panel 120 so that the amounts of transmission light and reflection light can be nearly equal.

Figure 9:
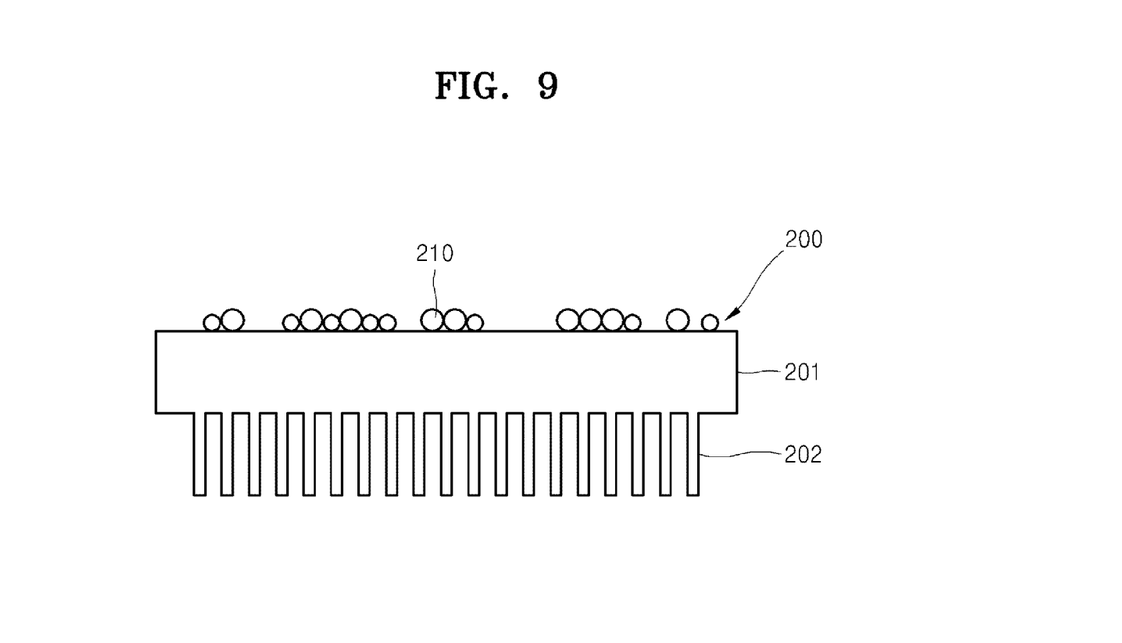
FIG. 9 is a schematic drawing showing an example of a chromatic dispersion compensation member according to another embodiment of the present invention.
Figure 10:
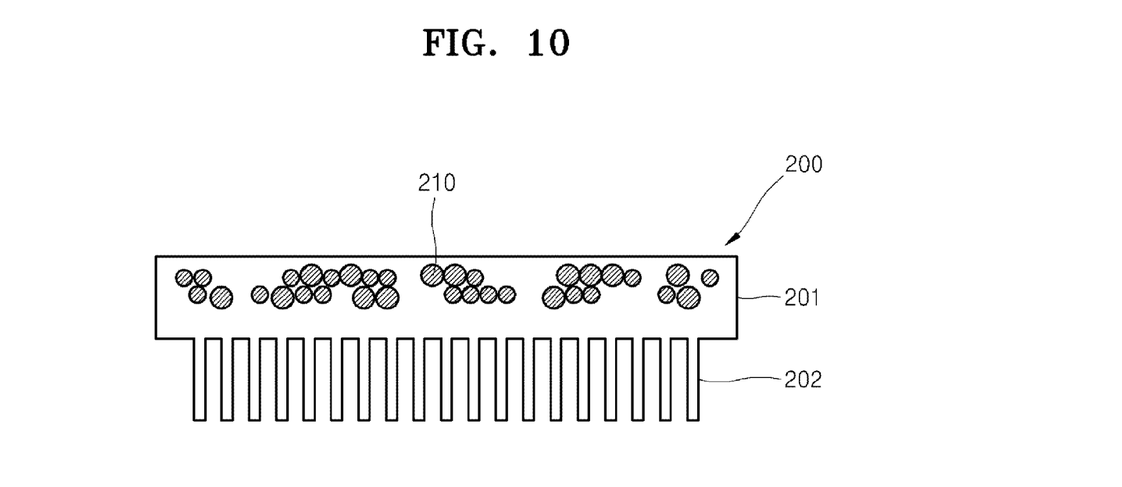
FIG. 10 is a schematic drawing of a modified version of the chromatic dispersion compensation member of FIG. 9, according to another embodiment of the present invention.
Figure 11A:
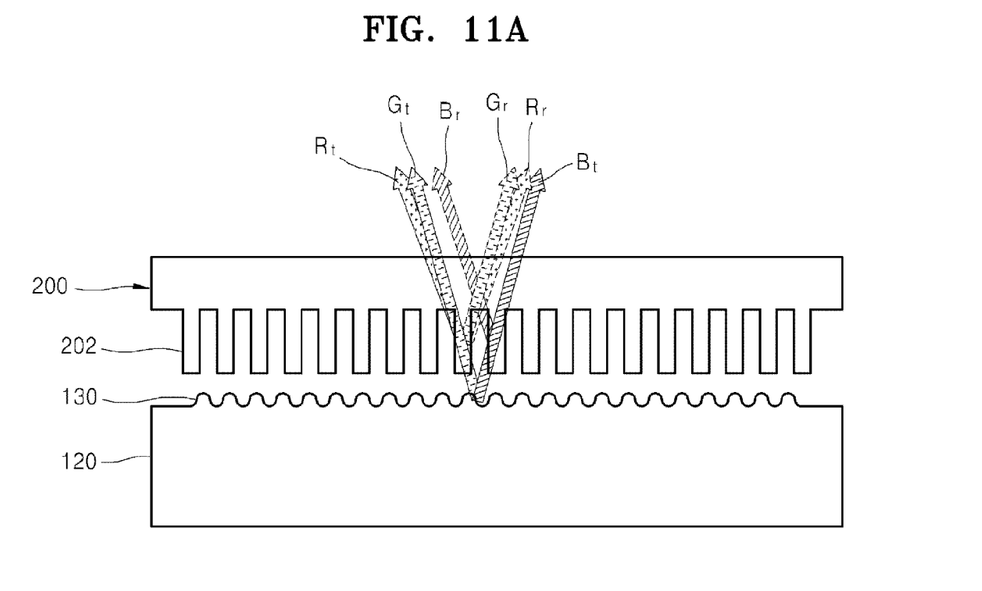
FIGS. 11A and 11B respectively are schematic drawings showing the effects of a chromatic dispersion compensation member when a dispersion pattern is used and when a dispersion pattern is not used.
Figure 11B:
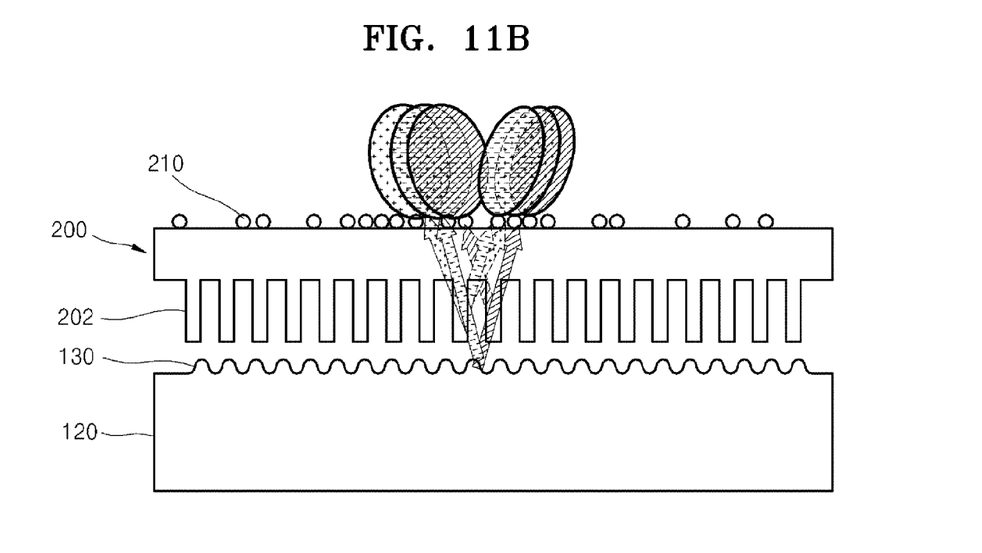

FIG. 9 is a schematic drawing showing an example of a chromatic dispersion compensation member according to another embodiment of the present invention, and FIG. 10 is a schematic drawing of a modified version of the chromatic dispersion compensation member of FIG. 9. Referring to FIGS. 9 and 10, dispersion patterns 210 that disperse light are formed on a base film 201 so that the chromatic dispersion compensation member 200 can function as a diffusion plate. The dispersion patterns 210 formed on the base film 201 can be beads having a diameter of a few to a few tens of micrometers as depicted in FIG. 9. Also, the dispersion patterns 210, as depicted in FIG. 10, can be beads that are dispersed in the base film 201, have a refractive index different from that of the base film 201, and have a diameter of a few to a few tens of micrometers. FIG. 11A shows a process of mitigating the chromatic dispersion in the chromatic dispersion compensation member 200 only having the lattice pattern 202. FIG. 11B shows the dispersion of light by the dispersion pattern 210.

Figure 12:
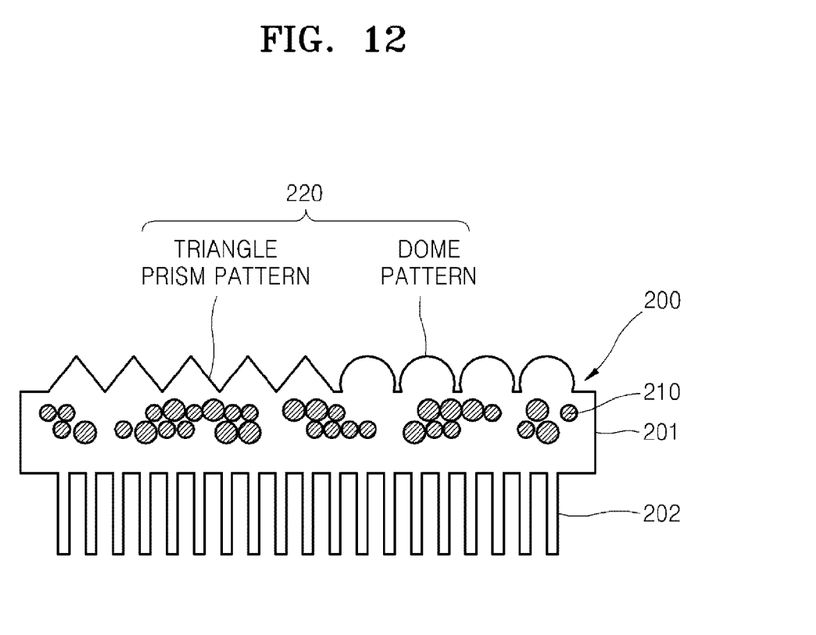
FIG. 12 is a schematic drawing showing another example of a chromatic dispersion compensation member according to another embodiment of the present invention.

FIG. 12 is a schematic drawing showing another example of a chromatic dispersion compensation member 200 according to another embodiment of the present invention. Referring to FIG. 12, the lattice pattern 202 is formed on a lower surface of the base film 201, and beads having a refractive index different from that of the base film 201 are dispersed in the base film 201 as the dispersion patterns 210. A focusing pattern 220 for condensing dispersed light is formed on the base film 201. The focusing pattern 220 can be a triangle prism pattern, a dome pattern, or a combination pattern of the triangle prism pattern and the dome pattern. Due to the above configuration, the chromatic dispersion compensation member 200 can function as both a diffusion plate and a focusing plate, thereby realizing a very thin backlight device. In a conventional backlight unit, a diffusion plate for diffusing light emitted from a light guide panel and a focusing plate for re-focusing the dispersed light to front-face light are separately used. However, in the present invention, since the diffusion function and the focusing function can be included both in the chromatic dispersion compensation member 200, the number of components of the backlight device can be reduced, thereby realizing thin backlight devices.

In order to confirm the effectiveness of the chromatic dispersion compensation member 200, the light guide panel 120 having a refractive index $n_{LGP}$ of 1.59 was prepared. The center-proceeding angle of light that proceeds in the light guide panel 120 was 65°, and so as to make the center axis $L_c$ of the chromatically dispersed light vertical with respect to the upper surface 122 of the light guide panel 120, the diffraction pattern 130 having a period of 350 nm is formed on the upper surface 122 of the light guide panel 120. The center axis $L_c$ is the center axis of red light R and blue light B.

Figure 13A:
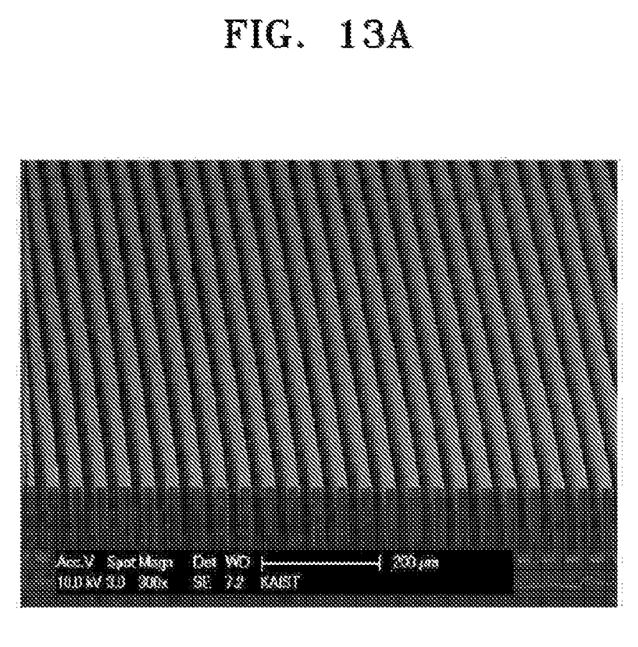
FIGS. 13A and 13B are photo images of mold master used for manufacturing lattice patterns according to an embodiment of the present invention.
Figure 13B:
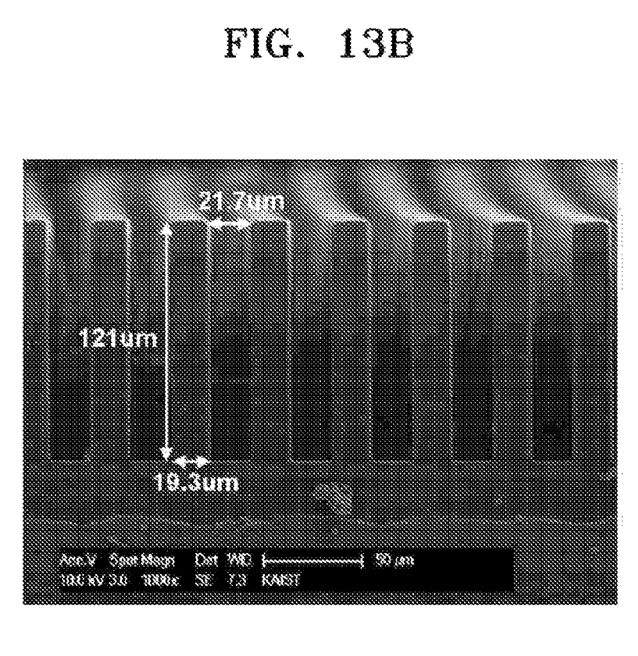

The period of the lattice pattern 202 is determined as 42 μm, and the lengths of the reflection dominant regions and the transmission dominant regions are 22 μm and 20 μm, respectively. Also, the depth T of the lattice pattern 202 is 120 μm so as to make an aspect ratio of 5 or more. A mold mater of the lattice pattern 202 that meets the above condition is formed using ploydimethyl siloxane (PDMS). FIGS. 13A and 13B are photographs of an actually manufactured lattice pattern mold master. The lattice pattern 202 is copied on a lower surface of a diffusion film CH19, which is used for forming a backlight and is a commercial diffusion plate manufactured by SKC Co. The diffusion film CH19 for forming the backlight has a structure in which a diffusion layer having distributed beads is formed on a polyethylene-terephthalate (PET) substrate.

Figure 14:
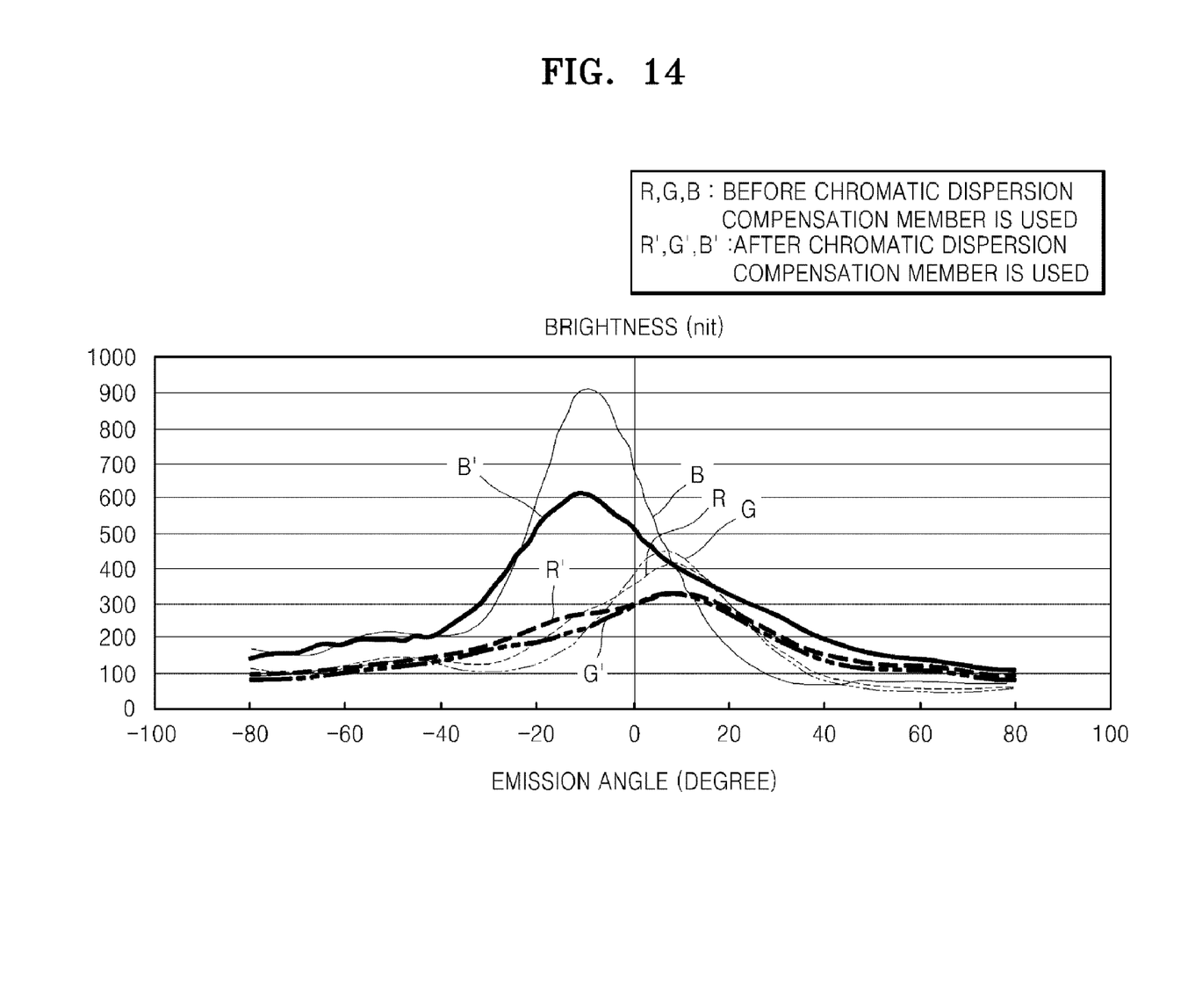
FIG. 14 is a graph showing the distribution of emission light before and after employing a chromatic dispersion compensation member having a lattice pattern and a scattering structure.

FIG. 14 is a graph showing the distribution of the emission light before and after employing the chromatic dispersion compensation member 200 with the lattice pattern 202. Referring to FIG. 14, it is seen that, before the chromatic dispersion compensation member 200 is employed, the brightness peak of the blue light B is concentrated at near −8 degrees and the brightness peaks of red light R and green light G are concentrated at +8 degrees with respect to an emission angle of 0 degrees. Also, it can be confirmed that, after the chromatic dispersion compensation member 200 is applied to the lattice pattern 202, the brightness peak of the blue light B' is significantly reduced, and the blue light B' and the red and green lights R' and G' are appropriately mixed in both left and right regions with respect to an emission angle of 0 degrees.

Figure 15A:
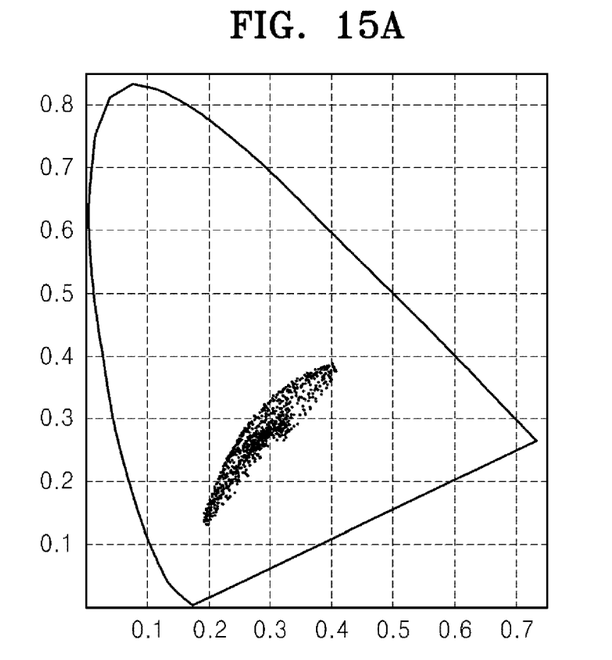
FIGS. 15A and 15B respectively are graphs of chromaticity coordinates before and after employing a chromatic dispersion compensation member having a lattice pattern and a scattering structure.
Figure 15B:
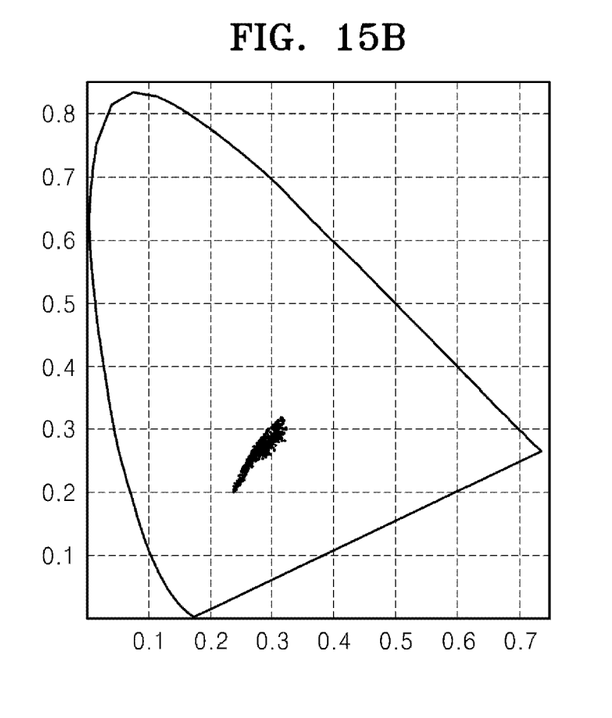

FIGS. 15A and 15B are graphs of chromaticity coordinates showing the degree of chromatic dispersion of light before and after employing the chromatic dispersion compensation member 200 having the lattice pattern 202 and a scattering structure, respectively. In FIG. 15A, color is widely distributed at the coordinate (0.3, 0.3). However, in FIG. 15B, color is concentrated at the coordinate (0.3, 0.3), that is, the chromatic dispersion is significantly improved.

As described above, a backlight device according to the present invention has the following advantages.

First, the chromatic dispersion of light emitted from a light guide panel having a single period of diffraction pattern can be significantly mitigated by applying a chromatic dispersion compensation member having a lattice pattern. Accordingly, it is unnecessary to form a diffraction pattern, which has at least two periods and involving a complicated manufacturing process, on the light guide panel for mitigating the chromatic dispersion.

Second, the period of the diffraction pattern of the light guide panel is formed so that a center axis of chromatically dispersed light can be vertical with respect to an upper surface of the light guide panel. Thus, the expansion of the spread angle of light that has passed through the chromatic dispersion compensation member can be minimized, thereby preventing the reduction of front-face brightness.

Third, a scattering pattern and a focusing pattern together with the lattice pattern are formed on the chromatic dispersion compensation member. Thus, the number of optical plates applied to the backlight device can be reduced, thereby realizing slim backlight devices.

While the present invention has been particularly shown and described with reference to embodiments thereof, it should not be construed as being limited to the embodiments set forth herein but as exemplary. It will be understood by one skilled in this art that the present invention is not limited to the structure and arrangement described above because various changes in form and details may be made therein without departing from the spirit and scope of the present invention Therefore, the scope of the invention is defined not by the detailed description of the invention, however, by the appended claims.

What is claimed is:

1. A backlight device that forms a flat fluorescent light source for illuminating a flat panel display device, comprising:
    a light guide panel having a diffraction pattern for emitting light through an emission surface of the light guide panel by diffracting light entering the light guide panel; and
    a chromatic dispersion compensation member that is an optical transmitting member located on a light emission side of the light guide panel and has a lattice pattern that reverses a portion of chromatically dispersed light emitted from the light guide panel with respect to a line that is vertical with respect to the emission surface of the light guide panel, and transmits the other portion of chromatically dispersed light emitted from the light guide panel,
    wherein the lattice pattern includes alternating protruded portions and concaved portions, and an aspect ratio of the lattice pattern, which is a ratio of a depth with respect to a width of the lattice pattern, is 5 or more, where the width of the lattice pattern is a width of the protruded portion, and the depth of the lattice pattern is a length of the protruded portion.

2. The backlight device of claim 1, wherein a period of the diffraction pattern is determined so that a center axis of light that is emitted from the light guide panel by being chromatically dispersed into red, green, and blue light is vertical with respect to the emission surface of the light guide panel.

3. The backlight device of claim 2, wherein when it is assumed that a half angle of a spread angle of light emitted from the light guide panel by being chromatically dispersed into red, green, and blue light is θ and a refractive index of the lattice pattern is n, the aspect ratio of the lattice pattern is $$\cot\left(\arcsin\left(\frac{\sin\theta}{n}\right)\right)$$

or more.

4. The backlight device of claim 1, wherein the protruded portion is a reflection dominant region and the concaved portion is a transmission dominant region, and wherein a period and the depth of the lattice pattern are determined so that the amount of light emitted from the chromatic dispersion compensation member after being reflected by the lattice pattern and the amount of light emitted from the chromatic dispersion compensation member by being directly transmitted through the lattice pattern are nearly equal.

5. The backlight device of claim 1, wherein the period of the lattice pattern is in a range from 10 μm to 300 μm.

6. The backlight device of claim 1, wherein the chromatic dispersion compensation member comprises a base film, and the lattice pattern is formed on a lower surface of the base film facing the emission surface of the light guide panel.

7. The backlight device of claim 6, wherein the base film comprises a dispersion pattern that disperses light.

8. The backlight device of claim 7, wherein a focusing pattern that focuses light is formed on an upper surface of the base film.

9. A backlight device that forms a flat fluorescent light source for illuminating a flat panel display device, comprising:
a light guide panel having a diffraction pattern having a single period for emitting light through an emission surface of the light guide panel by diffracting light entering the light guide panel; and
a chromatic dispersion compensation member that is an optical transmitting member located on a light emission side of the light guide panel, and comprising a lattice pattern that reverses a portion of chromatically dispersed light emitted from the light guide panel with respect to a line that is vertical with respect to the emission surface of the light guide panel, and transmits the other portion of chromatically dispersed light emitted from the light guide panel wherein the lattice pattern includes alternating protruded portions and concaved portions, and an aspect ratio of the lattice pattern, which is a ratio of a depth with respect to a width of the lattice pattern, is 5 or more, where the width of the lattice pattern is a width of the protruded portion, and the depth of the lattice pattern is a length of the protruded portion.

10. The backlight device of claim 9, wherein the single period of the diffraction pattern is determined so that a center axis of light that is emitted from the light guide panel by being chromatically dispersed into red, green, and blue light is vertical with respect to the emission surface of the light guide panel.

11. The backlight device of claim 10, wherein the chromatic dispersion compensation member comprises a rectangular shape lattice pattern having the depth in a direction vertical with respect to the emission surface of the light guide panel, and
wherein a period and the depth of the lattice pattern are determined so that the amount of light emitted from the chromatic dispersion compensation member after being reflected by the lattice pattern and the amount of light emitted from the chromatic dispersion compensation member by being directly transmitted through the lattice pattern are nearly equal.

12. The backlight device of claim 11, wherein the period of the lattice pattern is in a range from 10 μm to 300 μm.

13. The backlight device of claim 11, wherein when it is assumed that a half angle of a spread angle of light emitted from the light guide panel is θ and a refractive index of the lattice pattern is n, the aspect ratio of the lattice pattern is $$\cot\left(\arcsin\left(\frac{\sin\theta}{n}\right)\right)$$

or more.

14. The backlight device of claim 13, wherein the period of the lattice pattern is in a range from 10 to 300 μm.

* * * * *